United States Patent [19]
Hattori

[11] Patent Number: 5,928,379
[45] Date of Patent: Jul. 27, 1999

[54] VOICE-CODED DATA ERROR PROCESSING APPARATUS AND METHOD

[75] Inventor: Takeshi Hattori, Tokyo, Japan

[73] Assignee: NEC Corporation, Tokyo, Japan

[21] Appl. No.: 08/883,596

[22] Filed: Jun. 26, 1997

[30] Foreign Application Priority Data

Jun. 28, 1996 [JP] Japan ................................. 8-169153

[51] Int. Cl.⁶ .................................................. G06F 11/10
[52] U.S. Cl. .......................... 714/807; 370/79; 370/342; 375/40
[58] Field of Search ................................. 371/53; 370/79, 370/342; 375/40; 329/304

[56] References Cited

U.S. PATENT DOCUMENTS

| | | | |
|---|---|---|---|
| 4,223,405 | 9/1980 | Hattori | 455/105 |
| 4,621,368 | 11/1986 | Onoe et al. | 375/40 |
| 5,436,899 | 7/1995 | Fujino et al. | 370/79 |
| 5,586,113 | 12/1996 | Adachi et al. | 370/342 |
| 5,734,648 | 3/1998 | Adachi et al. | 370/342 |
| 5,781,570 | 7/1998 | Harotti | 371/53 |

FOREIGN PATENT DOCUMENTS

| | | |
|---|---|---|
| 3-162085 | 7/1991 | Japan . |
| 4-263528 | 9/1992 | Japan . |
| 7-87001 | 3/1995 | Japan . |
| 8-288914 | 11/1996 | Japan . |
| 9-261185 | 10/1997 | Japan . |
| 2237484 | 5/1991 | United Kingdom . |
| 2299917 | 10/1996 | United Kingdom . |
| WO9609700 | 3/1996 | WIPO . |

*Primary Examiner*—William Grant
*Assistant Examiner*—McDieunel Marc
*Attorney, Agent, or Firm*—Sughrue, Mion, Zinn Macpeak & Seas, PLLC

[57] ABSTRACT

A voice-coded data error processing system includes a demodulator, an error frame detection section, an error data identification section, a partial conversion section, and a decoder. The demodulator demodulates a received transmission frame containing voice-coded data which is encoded by ADPCM (Adaptive Differential Pulse Code Modulation) and modulated based on QPSK (Quadrature Phase Shift Keying). The error frame detection section detects an error in the transmission frame from CRC (Cyclic Redundancy Check) information contained in the voice-coded data output from the demodulator. The error data identification section identifies voice-coded data corresponding to an error portion when the error frame detection section detects an error frame. The partial conversion section converts only the voice-coded data corresponding to the error portion from the demodulator on the basis of an output from the error data identification section. The decoder decodes the voice-coded data output from the demodulator and the partial conversion section and outputs analog voice data. A voice-coded data error processing technique is also disclosed.

8 Claims, 5 Drawing Sheets

VOICE-CODED DATA ERROR PROCESSING APPARATUS AND METHOD

BACKGROUND OF THE INVENTION

The present invention relates to an error processing apparatus and method of performing error processing for voice-coded data based on ADPCM (Adaptive Differential Pulse Code Modulation).

A simple portable telephone system called a PHS (Personal Handy-phone System), which is in service in recent years, has a transmission frame including unique word information for detecting establishment of synchronization and a CRC (Cyclic Redundancy Check) information for detecting a frame error. However, this system does not have any particular error correction code for voice data transmitted in this frame.

In such a system, when the pull out based on a shift in unique word information is detected on the receiver side, or when a frame error is detected from the CRC information, mute processing of converting the entire error frame into muted data or repeated frame processing of repeatedly using the preceding frame is performed as error processing. However, when mute processing is performed, voice data suddenly becomes muted data, so click noise is generated. In repeated frame processing, voice-coded data after the error is eliminated becomes abnormal.

In the above-described error processing method, noise prevention is insufficient. Accordingly, an error processing method of reducing the difference in ADPCM voice-coded data when the difference is maximum is proposed. Alternatively, an error processing method of suppressing a degradation in voice quality by determining an error generation portion from a frame having an error and converting the corresponding portion is proposed.

More specifically, Japanese Patent Laid-Open No. 4-263528 discloses an error processing method for a digital communication system having a transmission frame including CRC information, in which the transmission frame is divided into a plurality of blocks, a block having an error is determined in the error frame, and only the block which is determined as a block having an error is converted.

FIG. 4 shows the arrangement of the above-described conventional communication system. Referring to FIG. 4, the conventional system comprises a demodulator 20 for demodulating a received frame, an error detection unit 22 for detecting an error in the transmission frame, a first muting circuit 21 for converting ADPCM voice-coded data into muted data depending on the presence/absence of an error, an ADPCM decoder 23 for converting the ADPCM voice-coded data output from the first muting circuit 21 into an analog signal, and a second muting circuit 24 for converting the decoded voice data output from the ADPCM decoder 23 into muted data depending on the presence/absence of an error.

FIG. 5 shows the structure of a transmission frame used in the communication system shown in FIG. 4. Referring to FIG. 5, the transmission frame is constituted by a preamble (PR) 30, a unique word (UW) 31, a voice frame 32 based on ADPCM, and a CRC 33 storing CRC information.

In this communication system, each of the voice frame 32 and the CRC 33 is divided into a plurality of blocks A to D and transmitted. On the reception side, an error block is determined by detecting an error from the CRC information of the CRC 33 in units of blocks A to D.

In the conventional communication system, however, since the error voice-coded data itself cannot be detected, normal voice-coded data in the error frame is rewritten. More specifically, even when the transmission frame is divided into a plurality of blocks to specify the error block, conversion processing is performed for the entire voice-coded data in the error block. For this reason, normal voice-coded data in the error block, which need not be converted, is converted. For this reason, the improvement of voice quality is insufficient in generation of an error frame.

Additionally, in the conventional communication system, in determining an error portion, each of the voice frame 32 and the CRC 33 is divided into a plurality of blocks, and an error block is detected from the CRC information in units of blocks. With this arrangement, the structure of the transmission frame is limited, so the error processing has no versatility.

SUMMARY OF THE INVENTION

It is an object of the present invention to provide a voice-coded data error processing apparatus and method which improve the voice quality in generation of an error frame.

It is another object of the present invention to provide a voice-coded data error processing apparatus and method which allow error processing to have versatility independently of the structure of a transmission frame.

In order to achieve the above objects, according to the present invention, there is provided a voice-coded data error processing apparatus comprising a demodulator for demodulating a received transmission frame containing voice-coded data which is encoded by ADPCM (Adaptive Differential Pulse Code Modulation) and modulated based on QPSK (Quadrature Phase Shift Keying), error frame detection means for detecting an error in the transmission frame from CRC (Cyclic Redundancy Check) information contained in the voice-coded data output from the demodulation means, error data identification means for identifying voice-coded data corresponding to an error portion when the error frame a detector detects an error frame, partial convertor for converting only the voice-coded data corresponding to the error portion from the demodulator on the basis of an output from the error data identifier, and decoder for decoding the voice-coded data output from the demodulator and the partial convertor and outputting analog voice data.

DESCRIPTION OF THE PREFERRED EMBODIMENT

The present invention will be described below in detail with reference to the accompanying drawings.

Figure 1:
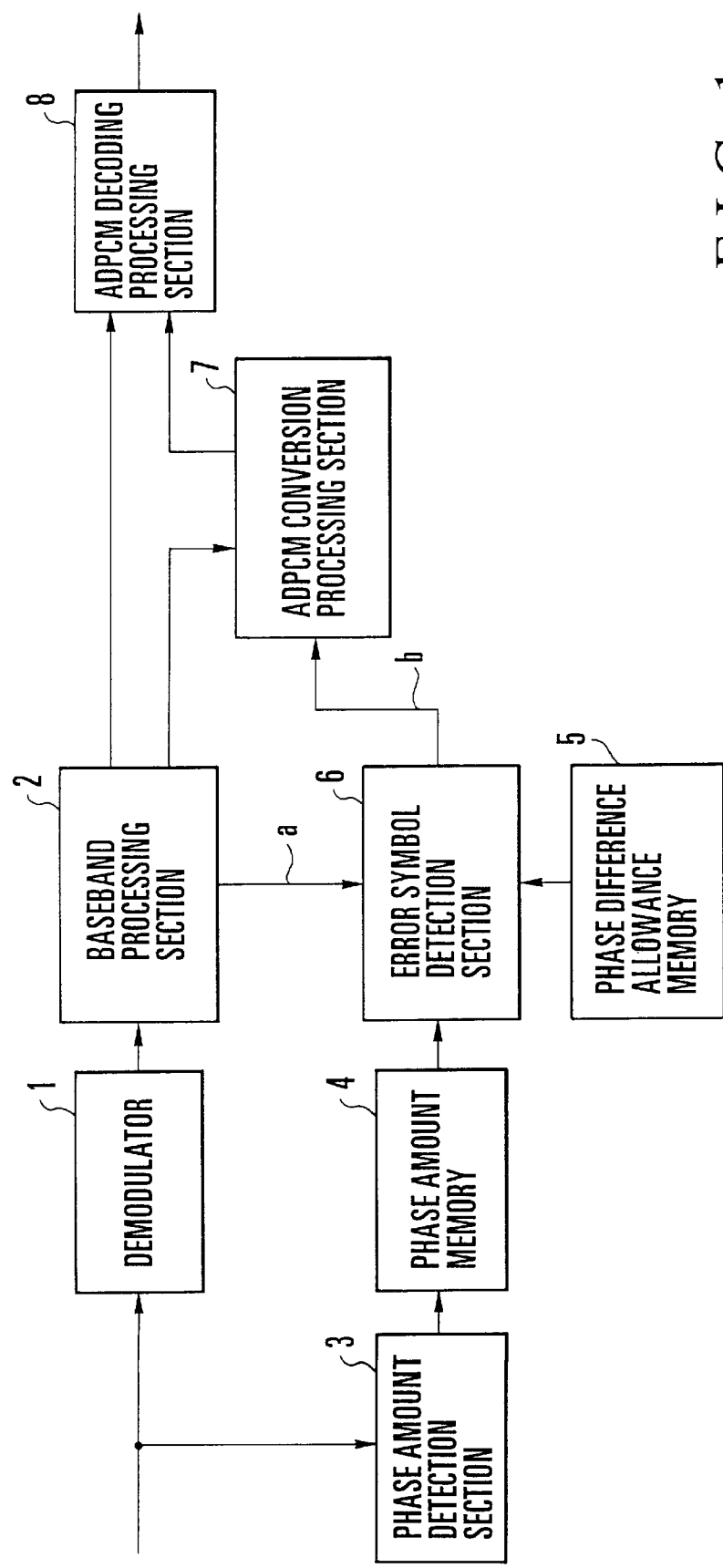
FIG. 1 is a block diagram of an ADPCM voice control unit according to an embodiment of the present invention.

FIG. 1 shows an ADPCM voice control unit according to an embodiment of the present invention. This ADPCM control unit is arranged on a reception side constituting a digital communication system called a PHS. This communication system modulates ADPCM voice-coded data by QPSK (Quadrature Phase Shift Keying) and performs radio communication. The ADPCM control unit performs error processing for ADPCM voice-coded data received in this communication system.

Referring to FIG. 1, the ADPCM control unit comprises a demodulator 1 for demodulating received voice-coded data, a phase amount detection section 3 for detecting the QPSK phase amount in units of symbols (to be described later) of the ADPCM voice-coded data from the received transmission frame, a baseband processing section 2 for detecting a frame error from CRC information in the demodulated transmission frame output from the demodulator 1, a phase amount memory 4 for storing the QPSK phase amount output from the phase amount detection section 3, a phase difference allowance memory 5 for storing a reference set value representing allowance for the phase amount, a symbol detection section 6 for comparing the phase amount read out from the phase amount memory 4 with the reference set value read out from the phase difference allowance memory 5 when a frame error detection signal is output from the baseband processing section 2, thereby extracting an error symbol, an ADPCM conversion processing section 7 which converts only voice-coded data containing the error symbol output from the baseband processing section 2 when the error symbol is output from the symbol detection section 6 in detection of the error frame such that the difference from the immediately preceding data becomes small, and an ADPCM decoding processing section 8 for decoding the voice-coded data output from the ADPCM conversion processing section 7.

Figure 2:
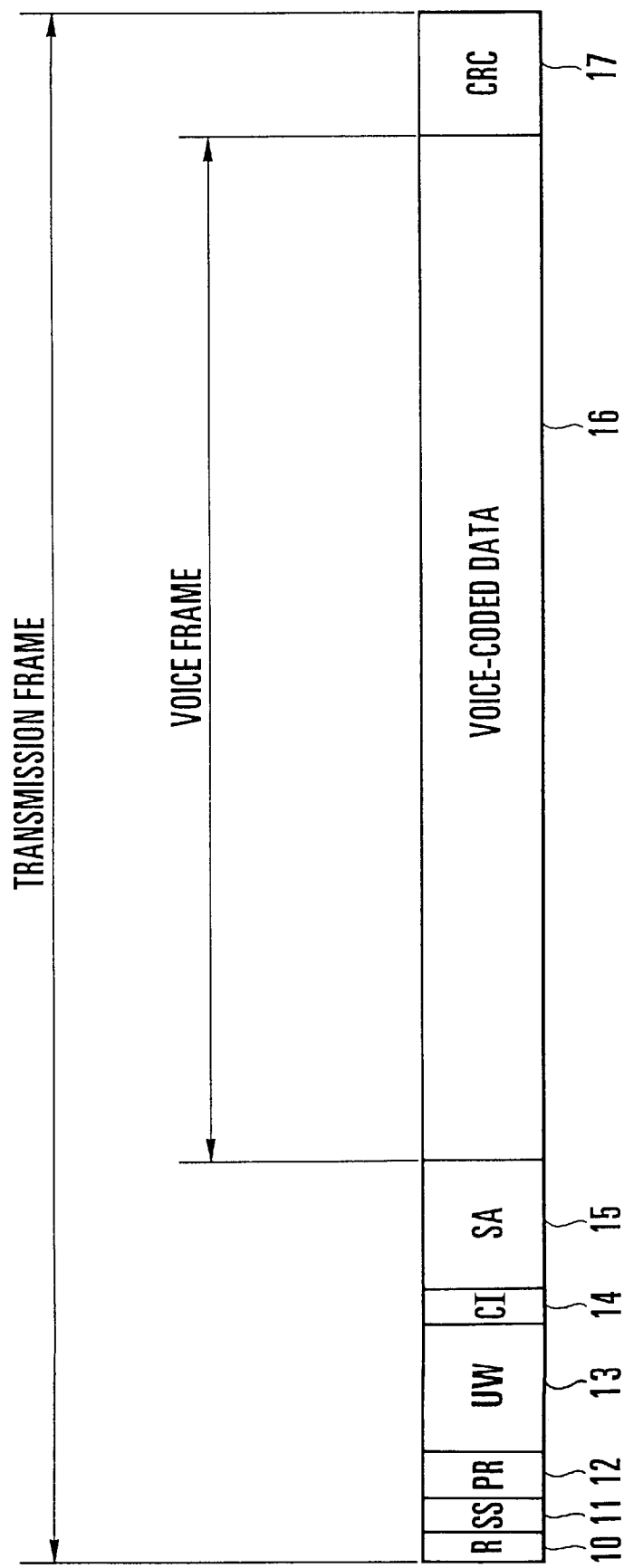
FIG. 2 is a view showing the format of a transmission frame used in a communication system having the ADPCM voice control unit shown in FIG. 1.

FIG. 2 shows the structure of a transmission frame used in the communication system having the ADPCM control unit shown in FIG. 1. Referring to FIG. 2, the transmission frame is constituted by a transient response ramp time (R) 10, a start symbol (SS) 11, a preamble (PR) 12, a unique word (UW) 13, a channel identification code (CI) 14, an SACCH (SA) 15, a voice frame 16 storing ADPCM voice-coded data, and a CRC 17. An error in the transmission frame is detected from CRC information of the CRC 17.

Figure 3:
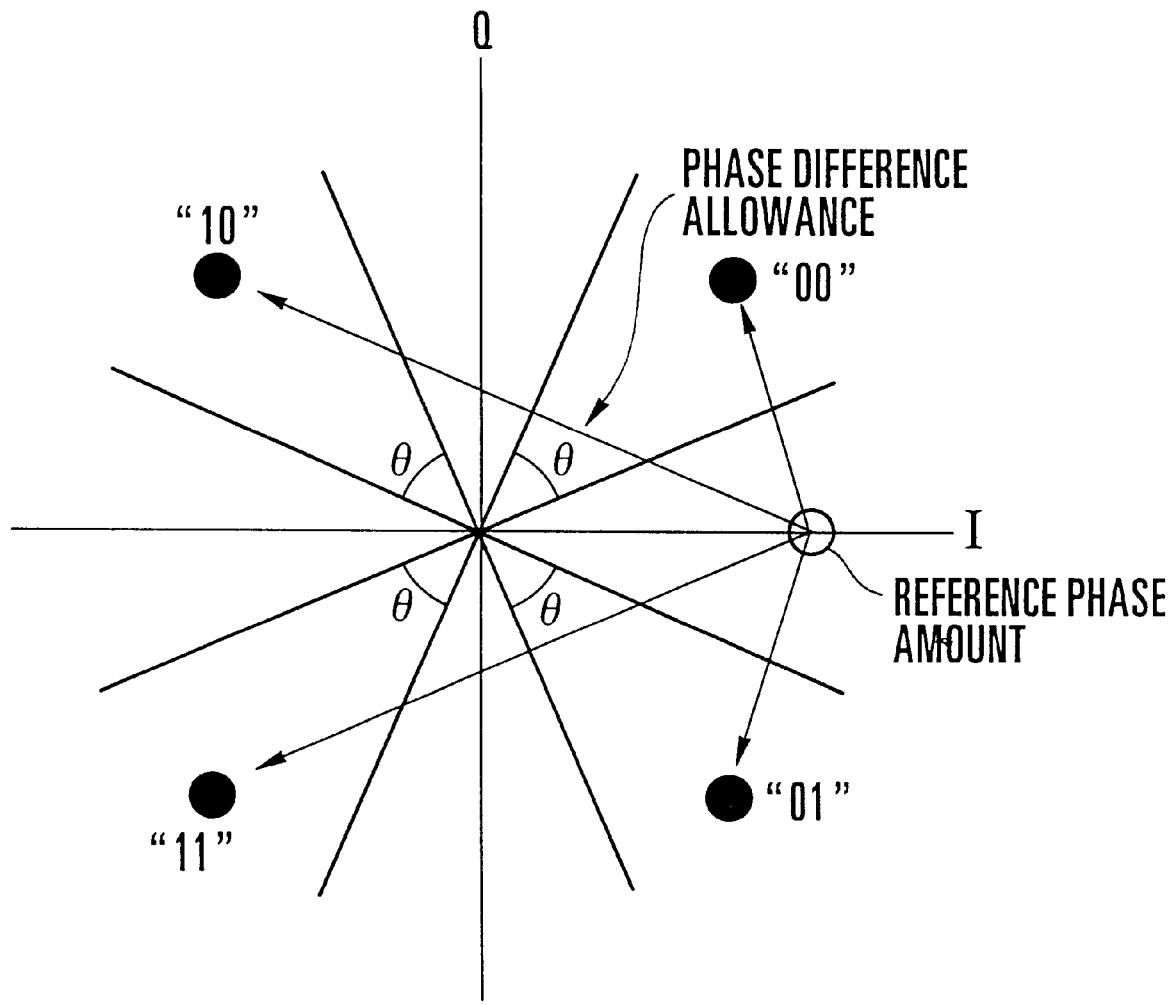
FIG. 3 is a view showing an example of $\pi/4$-shift QPSK encoding used in the communication system having the ADPCM voice control unit shown in FIG. 1.
Figure 4:
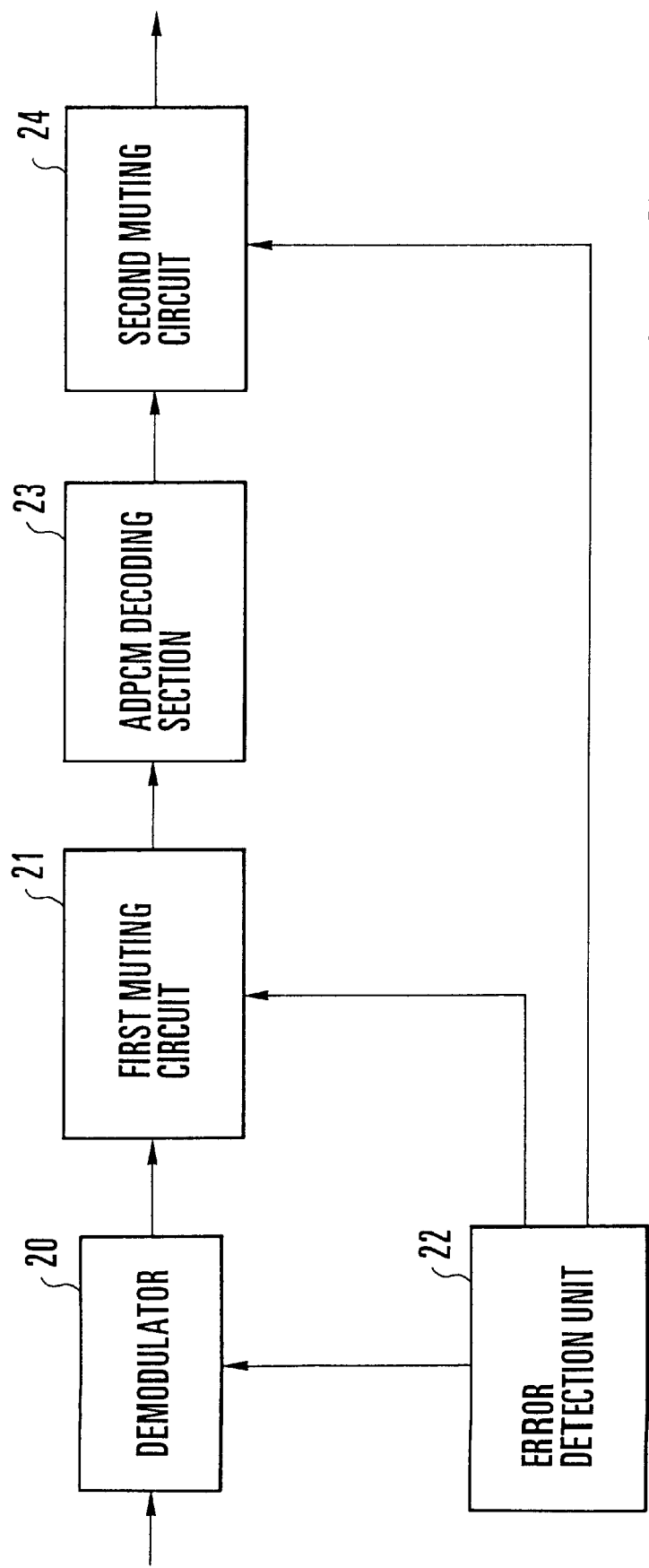
FIG. 4 is a block diagram of a conventional ADPCM voice control unit.
Figure 5:
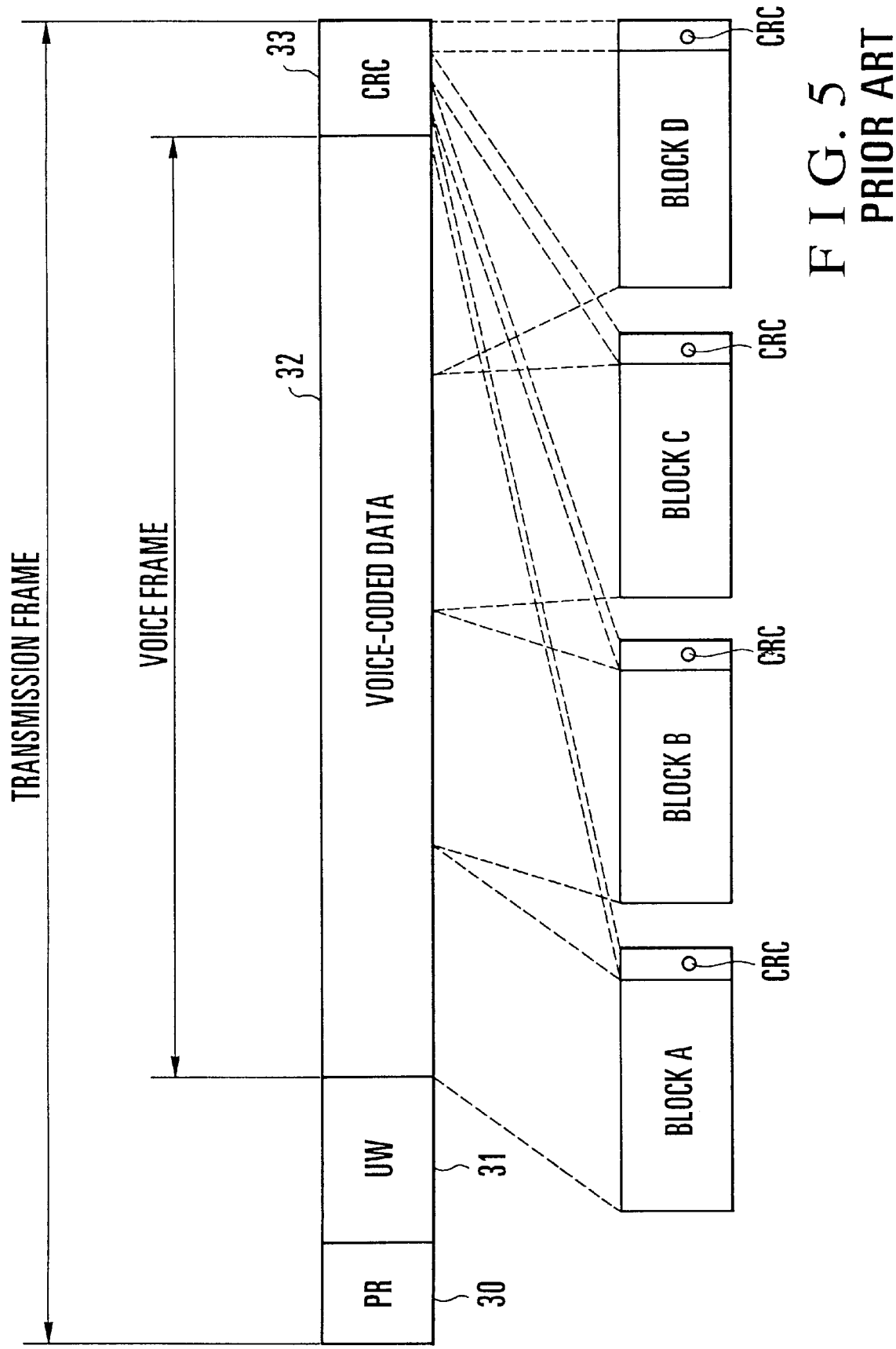
FIG. 5 is a view showing the format of a transmission frame used in a communication system having the ADPCM voice control unit shown in FIG. 4.

FIG. 3 shows π/4-shift QPSK encoding used in this communication system. In π/4-shift QPSK shown in FIG. 3, the reference phase of voice-coded data is set along an axis I. When the phase amount from the reference phase I is +45° (a position indicated by a bullet in FIG. 3), a 2-bit symbol (code) "00" is assigned. When the phase amount from the reference phase is +135°, as indicated by a bullet, a 2-bit symbol "10" is assigned. When phase amount from the reference phase is −135°, a 2-bit symbol "ll" is assigned. When phase amount from the reference phase is −45°, a 2-bit symbol "01" is assigned. The range of an angle θ centered on each bullet represents the phase difference allowance, i.e., a set value for determining whether the phase amount falls within the phase difference allowance. This set value is a reference for detecting an error symbol and is stored in the phase difference allowance memory 5, as described above.

The operation of the ADPCM control unit having the above arrangement will be described next with reference to FIGS. 1 to 3.

The demodulator 1 demodulates a received transmission frame and outputs the demodulated transmission frame to the baseband processing section 2. The phase amount detection section 3 detects the QPSK phase amount in units of symbols of the voice-coded data frame 16 in the received transmission frame and writes each phase amount in the phase amount memory 4. The baseband processing section 2 checks information of the CRC 17 in the demodulated transmission frame output from the demodulator 1. If no frame error is detected, the voice frame 16 is sent to the ADPCM decoding processing section 8.

When the baseband processing section 2 checks the CRC information and detects errors of at least one bit from the CRC information, a frame error is determined. The baseband processing section 2 outputs frame error information a to the error symbol detection section 6 and simultaneously outputs the voice frame 16 having the frame error to the ADPCM conversion processing section 7.

When the frame error information a is output from the baseband processing section 2, the error symbol detection section 6 reads out the phase amount from the phase amount memory 4 in units of symbols of the transmission frame having the frame error. The readout phase amount is compared with the reference set value read out from the phase difference allowance memory 5 to determine whether the phase amount falls within the phase difference allowance. At this time, the error symbol detection section 6 detects a symbol whose phase amount falls outside the phase difference allowance as an error symbol. Upon detecting the error symbol, error symbol information b is output to the ADPCM conversion processing section 7.

When the error symbol information b is output from the error symbol detection section 6, the ADPCM conversion processing section 7 converts the voice-coded data in the error frame output from the baseband processing section 2 such that the difference between the voice-coded data (4 bits) having the error symbol and the immediately preceding normal voice-coded data becomes small, and sends the converted data to the ADPCM decoding processing section 8. The ADPCM decoding processing section 8 receives the voice-coded data from the ADPCM conversion processing section 7, decodes the data into analog voice data, and outputs the analog data.

In reception of voice-coded data without any error frame from the baseband processing section 2 as well, the ADPCM decoding processing section 8 decodes the data into analog voice data. More specifically, when no error frame is detected, the voice-coded data from the baseband processing section 2 is decoded. When an error frame is detected, and the phase amount falls outside the phase difference allowance, the voice-coded data from the ADPCM conversion processing section 7 is decoded, and a series of analog voice data are output.

In this way, the QPSK phase amount is detected in units of symbols of the received transmission frame, and the detected phase amount of the voice-coded data is compared with the reference set value to determine whether the phase amount falls within the phase difference allowance. For a frame error, only ADPCM voice-coded data of several bits having the error symbol is converted such that the difference value from normal voice-coded data immediately before the voice-coded data becomes small. With this processing, the degradation in voice quality in generation of a frame error can be minimized.

In voice-coded data error processing, the transmission frame can be constituted by the voice-coded data frame 16 and the CRC 17 for detecting the frame error, and need not have the conventional frame structure in which each of the voice frame and the CRC is divided into a plurality of blocks, and an error block is detected from the CRC information in units of blocks. Therefore, frame error processing having transmission versatility can be realized.

As has been described above, according to the present invention, the voice-coded data corresponding to the error portion is identified and partially converted. With this arrangement, even in a system without any error code for voice-coded data, the error in voice-coded data can be properly detected, and the voice quality can be improved. In addition, since the transmission frame can be constituted by voice-coded data and CRC information for detecting a frame error, versatile error processing can be realized. Furthermore, since only voice-coded data of several bits having an error symbol is converted, the degradation in voice quality in generation of a frame error can be minimized.

What is claimed is:

1. A voice-coded data error processing apparatus comprising:

demodulation means for demodulating a received transmission frame containing voice-coded data which is encoded by ADPCM (Adaptive Differential Pulse Code Modulation) and modulated based on QPSK (Quadrature Phase Shift Keying);

error frame detection means for detecting an error in said transmission frame from CRC (Cyclic Redundancy Check) information contained in the voice-coded data output from said demodulation means;

error data identification means for identifying voice-coded data corresponding to an error portion when said error frame detection means detects an error frame;

partial conversion means for converting only the voice-coded data corresponding to the error portion from said demodulation means on the basis of an output from said error data identification means; and decoding means for decoding the voice-coded data output from said demodulation means and said partial conversion means and outputting analog voice data.

2. An apparatus according to claim 1, wherein said error data identification means comprises phase amount detection means for detecting a phase amount of the received voice-coded data in units of symbols each having a predetermined bit length, and determination means for determining whether the phase amount output from said phase amount detection means falls within a predetermined phase difference allowance when the error frame is detected by said error frame detection means, thereby detecting an error symbol.

3. An apparatus according to claim 2, wherein said partial conversion means converts only voice-coded data containing the error symbol when said determination means determines that the phase amount falls outside the allowance such that a difference from immediately preceding normal voice-coded data becomes small.

4. An apparatus according to claim 2, further comprising first memory means for storing the phase amount output from said phase amount detection means, and second memory means for storing in advance a reference set value representing the phase difference allowance, and wherein said determination means compares the phase amount read out from said first memory means with the reference set value read out from said second memory means to determine whether the phase amount falls within the allowance.

5. An apparatus according to claim 1, wherein said decoding means decodes the voice-coded data from said demodulation means when no error frame is detected by said error frame detection means, and decodes the voice-coded data from said partial conversion means when the error frame is detected by said error frame detection means.

6. A voice-coded data error processing method comprising the steps of:

demodulating a received transmission frame containing voice-coded data which is encoded by ADPCM (Adaptive Differential Pulse Code Modulation) and modulated based on QPSK (Quadrature Phase Shift Keying);

detecting a presence/absence of an error in said transmission frame from CRC (Cyclic Redundancy Check) information contained in the demodulated voice-coded data;

identifying voice-coded data corresponding to an error portion when an error frame is detected;

converting only the demodulated voice-coded data corresponding to the error portion on the basis of an identification result of the voice-coded data corresponding to the error portion; and decoding the demodulated voice-coded data and the partially converted voice-coded data and outputting analog voice data.

7. A method according to claim 6, wherein the step of identifying the voice-coded data corresponding to the error portion comprises the steps of detecting a phase amount of the received voice-coded data in units of symbols each having a predetermined bit length, and determining whether the detected phase amount falls within a predetermined phase difference allowance when the error frame is detected, thereby detecting an error symbol.

8. A method according to claim 7, wherein the step of converting only the voice-coded data corresponding to the error portion comprises the step of converting only voice-coded data including the error symbol when it is determined that the phase amount falls outside the allowance such that a difference from immediately preceding normal voice-coded data becomes small.

* * * * *